Sept. 6, 1966 T. A. MIDDLESWORTH ET AL 3,270,826
CHANGE SPEED TRANSMISSION FOR VEHICLE HYDROSTATIC DRIVE
Filed Sept. 23, 1963 5 Sheets-Sheet 1

Inventors.
Tommy A. Middlesworth
John F. Reynolds
Jack B. Findlay
By Walter G. Geary
Atty.

Inventors:
Tommy A. Middlesworth
John F. Reynolds
Jack B. Findlay
By Walter C. Greavy
Atty.

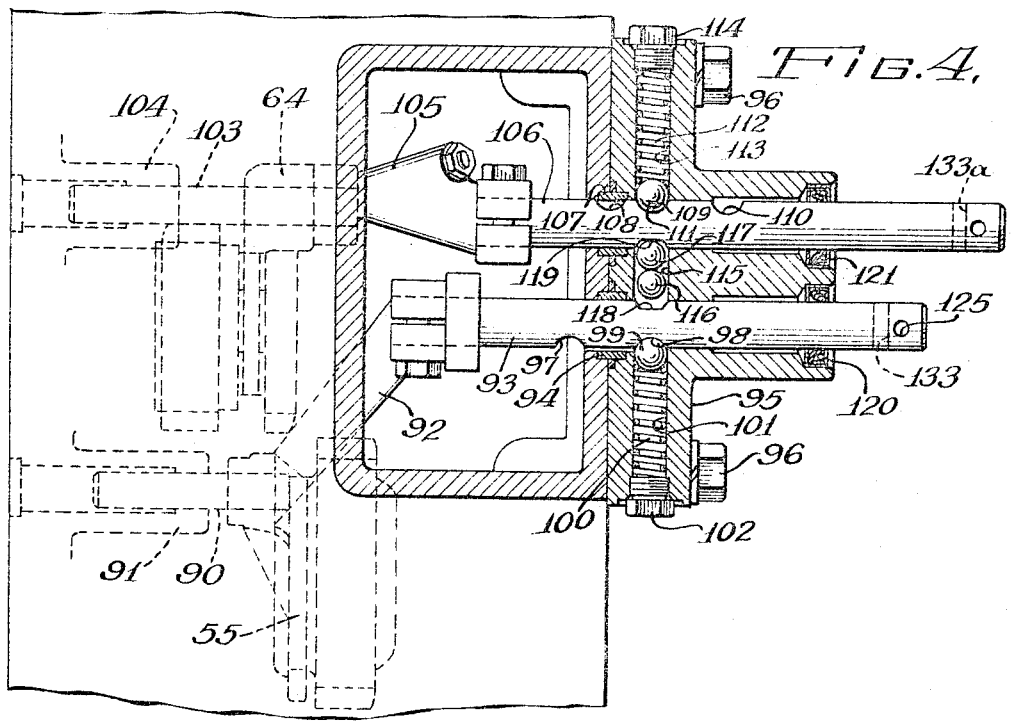
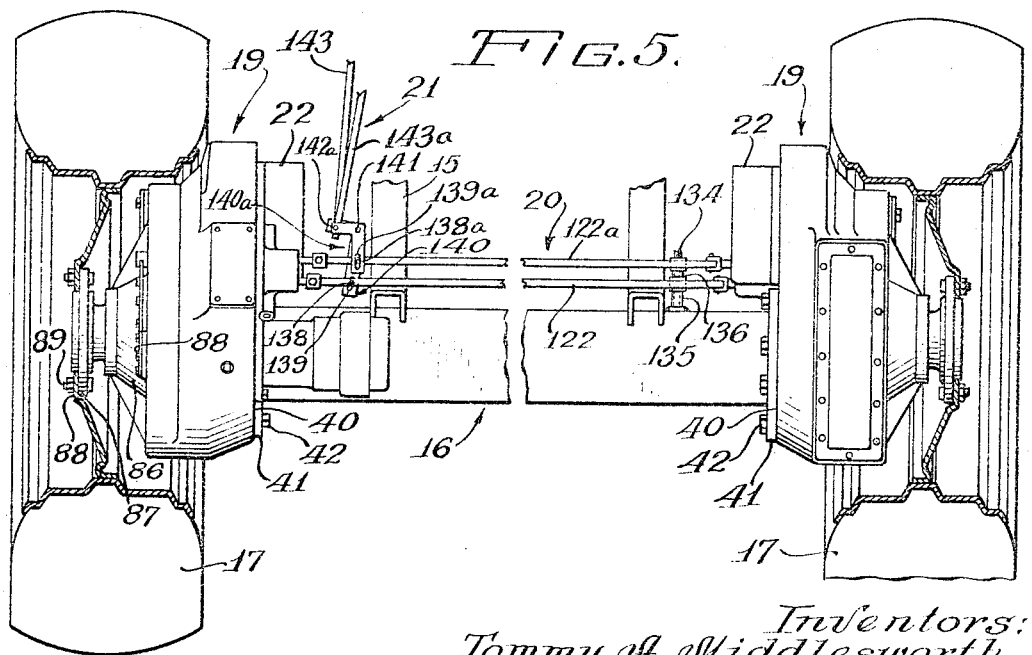

Sept. 6, 1966  T. A. MIDDLESWORTH ET AL  3,270,826
CHANGE SPEED TRANSMISSION FOR VEHICLE HYDROSTATIC DRIVE
Filed Sept. 23, 1963  5 Sheets-Sheet 5

Inventors:
Tommy A. Middlesworth
John F. Reynolds
Jack B. Findlay
By Walter G. Greavy
Atty.

United States Patent Office 3,270,826
Patented Sept. 6, 1966

3,270,826
CHANGE SPEED TRANSMISSION FOR VEHICLE HYDROSTATIC DRIVE
Tommy A. Middlesworth, Hinsdale, John F. Reynolds, La Grange, and Jack B. Findlay, Downers Grove, Ill., assignors to International Harvester Company, Chicago, Ill., a corporation of Delaware
Filed Sept. 23, 1963, Ser. No. 310,593
9 Claims. (Cl. 180—6.48)

This invention relates to change-speed transmission drives, but more particularly it is directed to a power drive of the character wherein rotary-type hydraulic motors are coupled one each through individual and manually-operable change-speed gear transmissions to respective traction wheels of an agricultural vehicle to provide propulsion or drive for said vehicle.

Heretofore, as is well known, hydraulic motors operated in combination with change-speed devices, have been used for vehicle drive mechanisms in a variety of installations and with varying degrees of success and effectiveness. The present invention, therefore, is concerned with providing as a primary object thereof a novel and improved hydraulic propulsion drive mechanism which utilizes manually operable speed varying means therein and which is particularly adaptable for use with combine-type agricultural vehicles.

Another object is to provide an improved change-speed gear-type transmission unit suitable for mounting in close proximity to a vehicle traction wheel, and which is particularly adaptable for employment as a power train component with hydraulic drive mechanisms for agricultural vehicles.

A further object is to provide an improved change-speed gear-type power drive transmission that is compactly and efficiently arranged and adapted for employment disposition partly within a vehicle traction wheel and partly in a limited space in the immediate vicinity of the vehicle traction wheel that is powered through said transmission by a rotary-type fluid pressure motor.

A still further object is to provide, in a power drive fashioned with a change-speed gear transmission in combination with a rotary type fluid pressure propulsion motor, a unique control linkage operative responsive to actuation by a single operator's control handle for selecting any desired speed ratio or range from those ranges available through said transmission and including interlocking detent means operative to prevent more than one such speed ratio being selected at a time therein.

A more general object is to provide an improved control linkage mechanism for operatively interconnecting the speed-range selecting elements of a pair of change-speed transmissions coupled one each to laterally spaced traction wheels of a vehicle powered by hydraulic motors, and whereby simultaneous operation is effected in the selection of the desired speed ranges in each of said transmissions for the power being transmitted therethrough to the respective traction wheels, but wherein the fluid flow to the hydraulic motors may be individually controlled so as to effect turning or steering of the associated vehicle.

A somewhat more specific object is to provide an improved and simplified speed-varying power drive means for a self-propelled agricultural combine-type vehicle.

The foregoing and other objects and advantages are attained by the present invention, various novel features of which will be apparent from the description herein and the accompanying drawings disclosing a preferred embodiment of the invention, and will be more particularly pointed out in the appended claims.

FIGURE 4 is a fragmentary vertical generally sectional view, in enlarged dimensions, taken generally along the line 4—4 of FIGURE 2.

FIGURE 5 is a fragmentary front end elevational view, with portions thereof in section, of the drive wheels and front axle assembly area of a combine vehicle showing the proposed interconnecting gear selection linkage for controlling the transversely spaced transmission units thereof.

FIGURE 8 is a detail in enlarged dimensions of operator's shift linkage control handle mechanism.

FIGURE 9 is a diagram of the shift pattern for the various speed-range selections.

Figure 1:
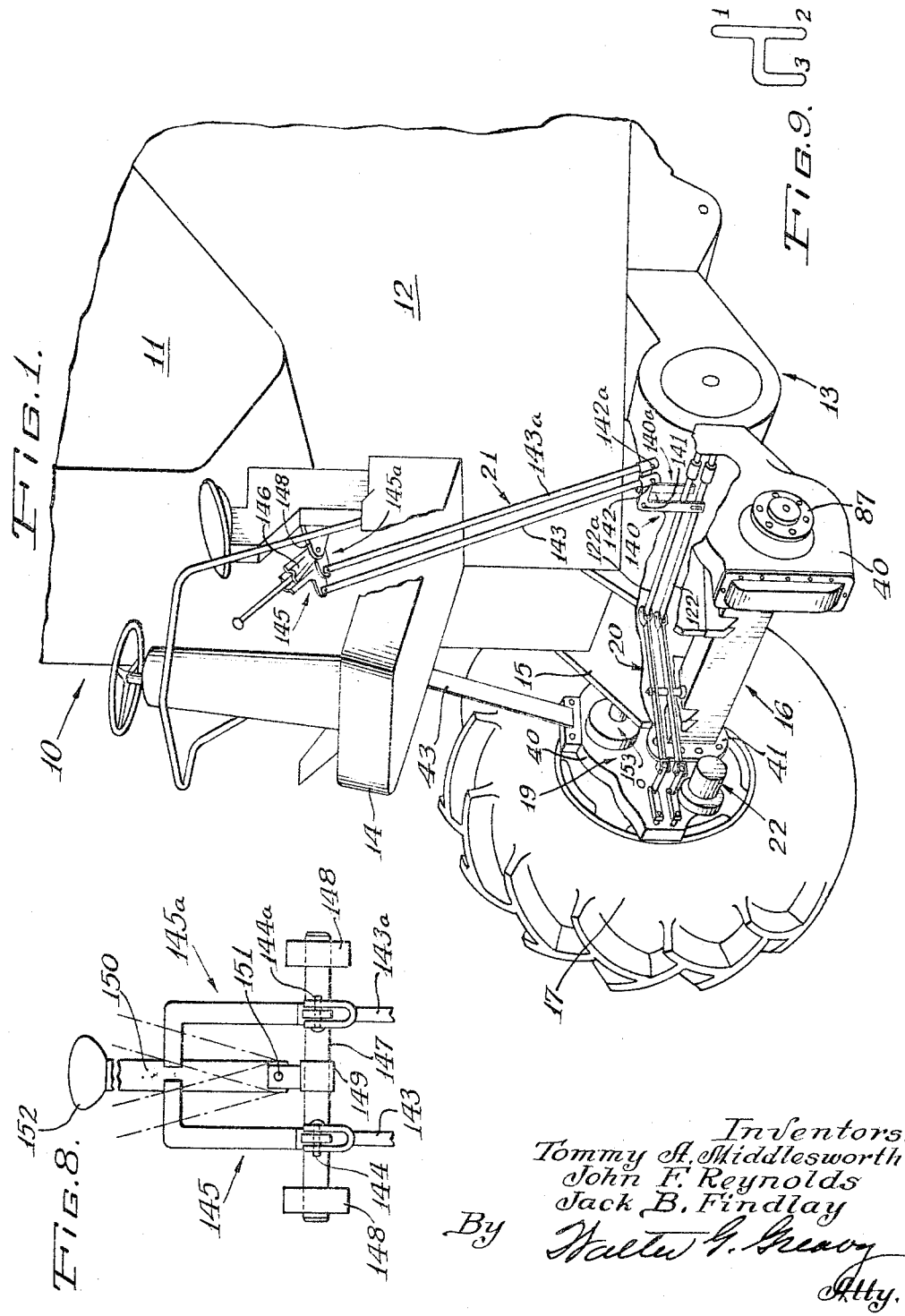
FIGURE 1 is a fragmentary perspective view of the forward end portion of an agricultural combine incorporating the proposed power drive therein and shown with the nearest traction wheel removed to better illustrate the proposed control linkage employed therewith.

Referring now to the drawings, it will be noted the proposed invention has been shown for illustrative purposes as incorporated in a self-propelled type of agricultural combine vehicle. Since the entire vehicle is not of particularly pertinent interest to the inventive features hereof only that portion of the vehicle which is of specific import or interest and application to the invention has been illustrated in detail in the drawings. The fragmentarily illustrated vehicle which is designated in its entirety by the reference numeral 10 includes as well-known and conventional components thereof a grain tank 11, a grain threshing, separating and cleaning chamber area 12, an air blower assembly 13 and an operator's station 14 all suitably mounted on a frame 15. Said frame, in turn, is supportably carried by way of a forwardly disposed affixed axle assembly 16 and a rear axle assembly (not shown) which assemblies are, respectively, carried by a pair of forward traction or propulsion wheels 17, 17 and a pair of rear support and guide wheels (not shown). It is understood, of course, suitable conventional mechanism will be provided to support and control the said guide wheels. Since the threshing, separating and cleaning operations are accomplished in a generally conventional and well-known manner, further details of construction of the components for accomplishing these specific operations are believed unnecessary to a proper understanding of the invention, and hence for the sake of brevity and clarity are omitted herefrom. It will be understood, of course, that these various operating components will (by means not shown) be suitably connected to and powered by the associated vehicle's prime mover or engine shown only schematically and indicated herein by the reference numeral 18.

Figure 7:
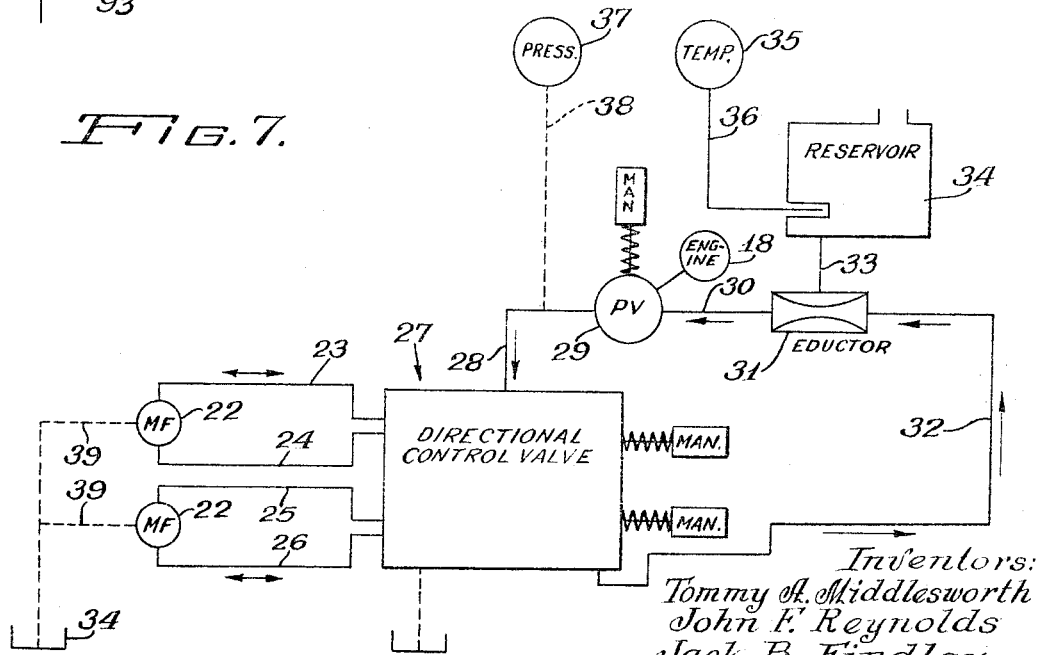
FIGURE 7 is a schematic diagram of the hydraulic circuit employed with the proposed hydraulic power drive.

Each of the transversely spaced traction wheels 17, 17 has disposed, in part, therewithin a change-speed transmission unit assembly, such as is indicated in the entirety by reference numeral 19, but since the two such transmission units are identical in construction only one thereof will be described in detail. Said transmission units 19, 19 are interconnected for simultaneous speed-ratio change operations by control linkage such as is indicated generally at 20 and this linkage, in turn, is operatively joined by linkage mechanism 21 which extends to the operator's station 14 where it is available for actuation by the vehicle operator. Each said transmission unit is motivated or driven by a conventional fluid-pressure motor such as the well known rotary-type hydraulic motor indicated generally at 22 and said motors, in turn, are connected by fluid-carrying conduits 23, 24 and 25, 26 respectively, to a directional control valve assembly indicated in its entirety at 27. Said directional control valve has the input or pressure side thereof connected by a conduit 28 to the pressure outlet of a conventional hydraulic pump 29 which, in turn, is power driven by the vehicle engine 18 through suitable drive means (not shown). The inlet side of said pump is connected by conduit 30 to one end of an eductor device 31 while an opposite end of said eductor is connected by conduit 32 with the outlet or exhaust side of directional control valve 27 and a mid-portion of said eductor is connected by a conduit or fluid passage 33 into a fluid reservoir 34. Eductor 31 may be of the type disclosed in co-pending U.S. application Serial No. 248,661 and assigned to the same assignees as the present invention. Reservoir 34 may be equipped with a temperature gauge 35 connected thereto by a conduit 36, and, if desired, a pressure gauge 37 may be connected into pressure conduit 28 by a conduit line 38. Directional control valve 27 may be any suitable conventional device such as will permit individual operational control of the hydraulic drive motors 22, 22 including the directional control thereof. A valve assembly suitable for such control is disclosed in the co-pending U.S. patent application Serial No. 295,731 and assigned to the same assignees as the present invention. Suitable drainage or seepage conduit lines such as represented by the broken lines 39 (FIGURE 7) may be utilized to drain leakage fluid from the hydraulic motors to reservoir 34 as is well known.

Figure 3:
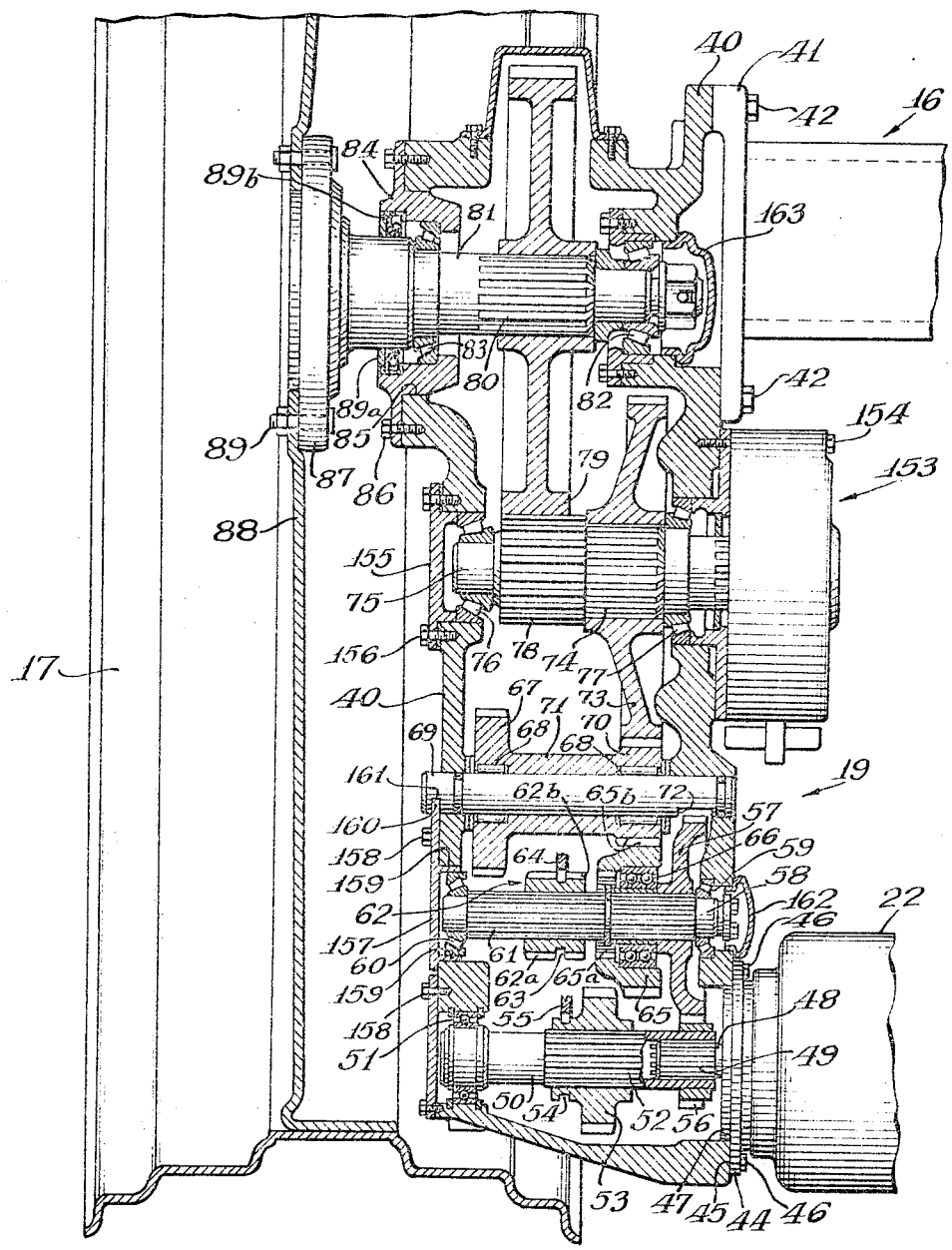
FIGURE 3 is a transverse sectional and vertically elongated view taken generally along the line a-b-c-d-e-f-g of FIGURE 2 and shows the relative disposition of the gear elements in a typical one of the change-speed transmissions of the invention, the transmission being conditioned in this view for neutral operation.

For a clearer understanding of the specific features of the proposed transmission units, reference may be had to FIGURE 3 wherein there is depicted a vertical sectional view of one such unit and which view has been intentionally, distortably elongated, or developed so as to more clearly show the engageable relationship of the various journalling shafts and meshing gear elements therewithin. It will be appreciated, of course, that, although this figure of the drawings shows all the gears and their journalling shafts in a vertically spaced arrangement, the actual disposition of these elements more clearly resembles an irregularly formed circular geometric figure with the various components neatly and effectively compacted and clustered within the transmission unit's housing. The transmission unit, as fashioned, includes a housing or casing structure 40 having a flanged rim or boss-like portion on one wall thereof which seatingly mates with a similarly flanged portion 41 on one end of front axle assembly 16 whereby the said unit is mounted to the axle and may be fixedly secured thereto by suitable fastening means such as the cap screws or bolts indicated at 42. A reinforcing member or brace 43 (FIGURE 1), preferably, is extended from one side of frame 15 proximate operator's platform 14 to the housing 40 of the proximate transmission unit for the purpose of providing added rigidity to said transmission housing. Although only one such brace has been illustrated, it will be understood a similar brace may also be provided for the oppositely disposed housing unit. Each hydraulic motor 22 has a flanged portion 44 thereon which mates with a similar seating portion 45 on the same side wall of housing 40 to which axle assembly 16 is attached and suitable fastening cap screws or bolts 46 may provide means for fixedly securing the hydraulic motor to said housing. An aperture 47 in said transmission housing accommodates the drive shaft 48, of the respective hydraulic motor, which shaft extends into said transmission unit and is telescopingly joined or coupled therein, by any suitable means such as the splining indicated at 49, to a shaft 50 journalled at its opposite end by the anti-friction bearing 51 in transmisison housing 40.

Exterior splines 52 on shaft 50 slidably accommodate a spur gear member 53 which is dimensioned and disposed for axially slidable movement therealong. A generally U-shaped annular recess or channel 54 fashioned on a hub portion on one side of gear 53 receivingly accommodates a shifter fork mechanism indicated fragmentarily at 55, for purposes of slidably actuating said gear as will be subsequently explained. Also mounted by splines 52 on shaft 50 is a gear 56 which is disposed for continuous meshing engagement with a gear 57 mounted on and constrained for rotation with a shaft 58 journalled at opposite ends thereof by the respective bearing means 59 and 60 in opposite side walls of housing 40. Exterior splines 61 fashioned on shaft 58 slidably accommodate a cluster-type gear 62 which is slidably movable therealong and comprises the gears 62a and 62b with an annular channel or recess 63 therebetween adapted to operatively receive therewithin a shifter fork mechanism, such as indicated fragmentarily at 64. A gear member 65, journalled by bearing means 66 on shaft 58, includes an interior ring gear portion 65a and an exterior gear portion 65b. The gear cluster 62 is axially slidable in one direction through actuation by shifter fork mechanism 64 for effecting meshing engagement of gear 62b with ring gear 65a, and in an opposite direction for meshingly engaging gear 62a with a gear 67 journalled by sleeve bearing means 68 on a stub shaft 69 suitably mounted in opposite side walls of transmission housing 40. Exterior gear 65b is disposed for continuous meshing engagement with the gear 70 also journalled on shaft 69 and attached by an axially extending hub or quill-like portion 71 to gear 67 and constrained for rotation therewith. A cut-away portion proximate one end of stub shaft 69 provides a recess or shoulder 72 in said shaft which accommodates in a physical clearance relationship the teeth of gear 57 otherwise in engaging conflict with said latter stub shaft. Gear 70 is also disposed for continuous meshing engagement with a gear 73 which is mounted by splines 74 onto a shaft 75 journalled at opposite ends thereof by the respective anti-friction bearing means 76 and 77 in the opposite side walls of housing 40. A gear 78 fashioned proximate one end of shaft 75 is disposed for continuous meshing engagement with a gear 79 mounted by the splines 80 onto a shaft 81 journalled by anti-friction bearing means 82 at one end thereof in one sidewall of housing 40, and at the opposite end of said shaft by the anti-friction bearing means 83 which are carried by a ring-like bushing or closure member 84 disposed in an aperture 85 in housing 40 and suitably detachably secured therein by fastening bolts 86. Although gear 79 has been illustrated as being fashioned as a unit, it will be understood that a gear of these dimensions may for production purposes be fabricated of several elements suitably fastened to one another without deviating from any teachings hereof. One end of shaft 81 extends outwardly through the bushing 84 and has a flange 87 mounted on the outer end thereof and which is disposed for attachment to the flange portion 88 of a traction wheel 17 and secured thereto by fastening bolts or cap screws such as shown at 89. A fluid seal 89a may be provided in a counter-bore portion 89b of said bushing to restrict fluid leakage along shaft 81 as is well understood.

With cluster gear 62 neutrally positioned axially so as to be out of engagement with gears 67 and 65 and gear 53 out of engagement with gear 65 the power train through the transmission is interrupted and the unit is termed as being conditioned for neutral operation. With gears 53 and 65 disengaged while gears 62a and 67 are in meshing engagement the power path through the transmission is from shaft 50 to gear 56, gear 57, shaft 58, gear 62a, gear 67, hub portion 71, gear 70, gear 73, shaft 75, gear 78, gear 79, shaft 81, to external flange 87 and the flange 88 of the respective traction wheel 17 and the unit is then conditioned for the first gear ratio or speed-range therethrough. In the second gear ratio or speed-range drive is from shaft 50 to gear 56, gear 57, shaft 58, gear 62b, ring gear 65a, gear 65b gear 70, gear 73, shaft 75, gear 78, gear 79, shaft 81, to external flange 87 and the flange 88 of the respective traction wheel 17. In the third gear ratio or speed range drive is from shaft 50 to gear 53, gear 65b, gear 70, gear 73, shaft 75, gear 78, gear 79, shaft 81, to external flange 87 and the flange 88 of the respective traction wheel 17.

Figure 2:
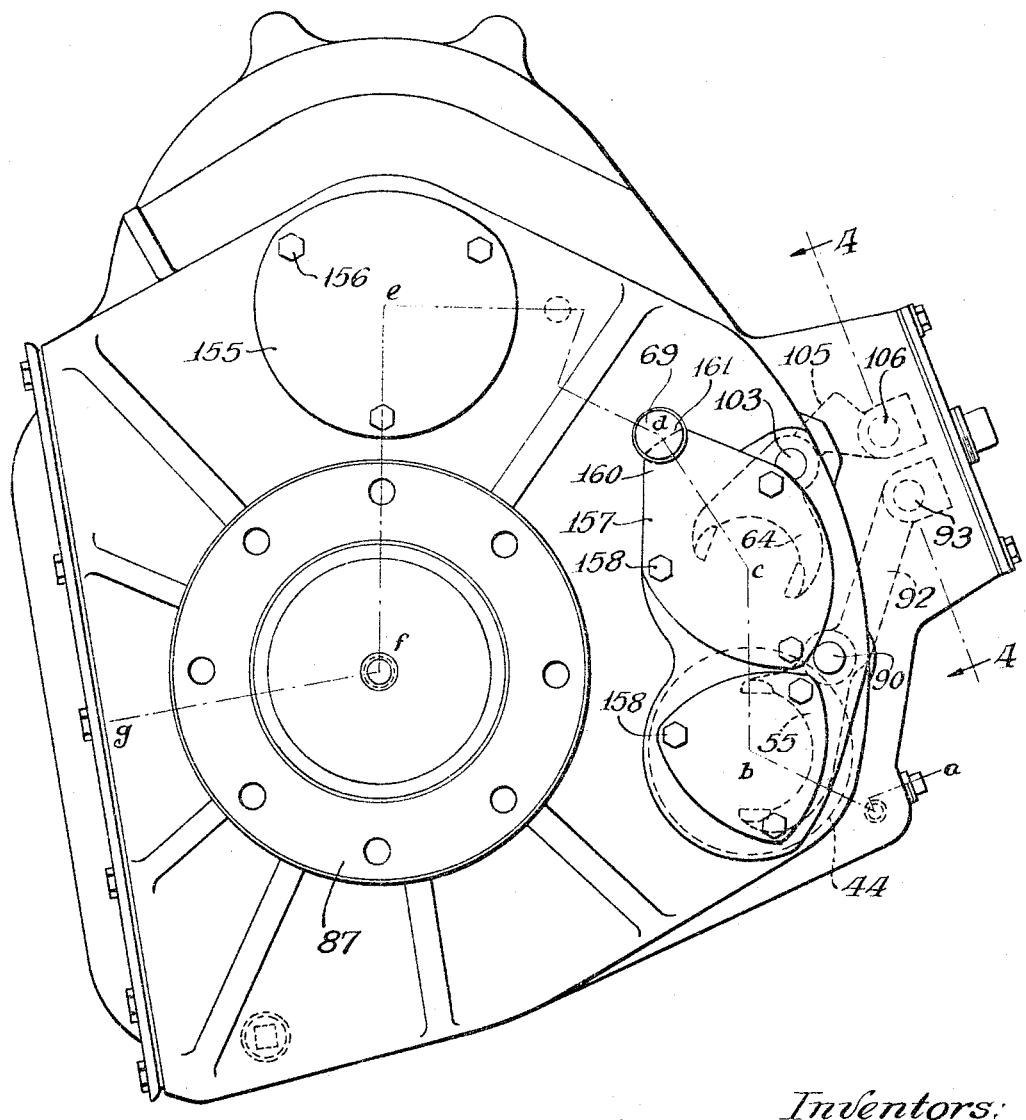
FIGURE 2 is a side elevational view viewed from the wheel attaching side of the change-speed transmission unit of the proposed invention.

The shifter fork 55 is mounted on and suitably secured to a stub shaft 90 (FIGURES 2 and 4) which, in turn, is slidably mounted for axial movement in a journalling boss 91 in one side of housing 40. Said shifter fork is also provided with a rigidly connected arm 92 the free end of which is securely but detachably mounted on a short operating shaft 93 journalled by sleeve bearing 94 which mounts partially in a side wall portion of housing 40 and in part in an extension bearing and sealing member 95 affixed to said housing by suitable means such as the screws 96. Detent recesses 97 and 98 axially spaced along one side of shaft 93 are adapted to receive a ball detent member 99 forced selectively thereinto by a spring 100 disposed in an aperture 101 in said extension member and retained therein by a threaded closure plug 102. The shifter fork 64 is similarly mounted on and suitably secured to a stub shaft 103 slidably mounted for axial movement in a journalling boss 104 in one side wall of housing 40. Fork 64 includes a rigidly connected arm 105 the free end of which is securely but detachably mounted on a short operating shaft 106 journalled by a sleeve bearing 107. Detent recesses 108, 109 and 110 axially spaced along one side of shaft 106 are adapted to receive a ball detent member 111 pressed selectively thereinto by a spring 112 disposed in an aperture 113 in said extension member and retained therein by a threaded closure plug 114. A transversely disposed aperture 115 extending between the shafts 93 and 106 contains two ball detent members 116 and 117 that are disposed for selective positioning one each into respective detent recesses 118 and 119 in the respective shafts 93 and 106. The recesses 118 and 119 are radially displaced one each from a respective one of the recesses 98 and 109. This transversely disposed or intermediate detent mechanism provides an interlock feature so as to assure that one of the shafts 93 and 106 is always in neutral. In this manner only when one shaft is in neutral may the remaining shaft be shifted to provide a desired gear speed ratio range drive selection. Then in order to shift the first of said shafts the second one thereof must be neutrally positioned. Fluid sealing devices such as indicated at 120 and 121 may be provided to restrict fluid flow along the respective shafts 93 and 106 as is generally conventional. It will be understood, of course, that each transmission unit includes the shifter forks actuating members just described and that such shifter fork mechanisms are interconnected by the control linkage 20 as hereinafter noted.

The interconnecting control linkage 20 comprises a pair of linkage assemblies arranged so that one such linkage interconnects the corresponding upwardly disposed and outwardly projecting short operating shafts designated 106 of each transmission unit, while the other linkage similarly interconnects the corresponding operating shafts designated 93. Each such linkage includes a transversely extending long link or rod 122 connected at one end by a connector 123 affixed to one end of link 122 and having a cap screw 124 therein positionable in a radial aperture 125 in shaft 93, and at its opposite end is pivotally connected at 126 to a longitudinally extending, direction reversing lever 127. The opposite end of lever 127, in turn, is pivotally connected at 128 to an arm 129 of a crank and the other end of arm 129 is pivotally connected at 130 to another arm 131 of said crank. The opposite end of said latter arm includes a split end that fits over the end portion of shaft 93 in the proximate transmission unit and a cap screw 132 threaded therein is received in a slot-like recess 133 in shaft 93. In similar fashion the shafts 106 of the respective transmission units are interconnected with similar linkage elements designated by the same reference numerals for like elements plus the suffix "a."

Figure 6:
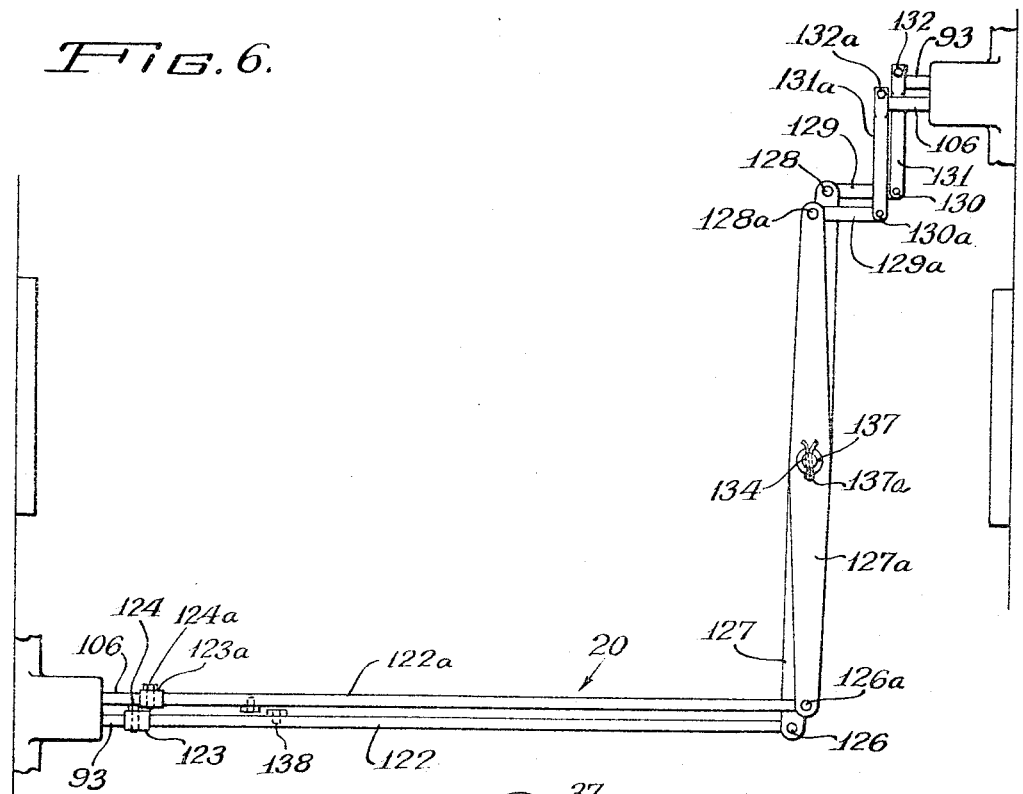
FIGURE 6 is a fragmentary plan view of the interconnecting gear selection linkage control members.

A post-like stud or pin 134 fixedly mounted on axle assembly 16 pivotally supports the reversing levers 127, 127a with sleeve-like spacers 135 and 136 therebetween, while a washer 137 and cotter pin 137a on the outer end thereof operates to retain said lever in position on the pin. It will now be seen that as the link 122 is moved to the left, as viewed in FIGURES 4–6, both the shafts 93, 93 move inwardly into the respective transmission units, and contrawise when said link is moved to the right. Similarly when link 122a is moved leftwardly the shafts 106, 106 are moved inwardly, and contrawise when said latter link is moved rightwardly. It will also be noted that the two linkage assemblies which comprise control linkage 20 although operable independently of one another have the movements thereof further correlated by the interlocking intermediate detents previously described.

The transversely extending link 122 has a pin or stud 138 affixed thereto that receives a slotted opening 139 fashioned in one arm of a bell-crank 140 which, in turn, is pivotally mounted at 141 on the vehicle frame 15 while the other arm of said bell-crank is pivotally connected at 142 to a vertically extending long link or rod member 143. The opposite end of said latter rod member is pivotally connected at 144 to one arm of an upwardly disposed bell-crank 145 while the other arm of said latter bell-crank is fashioned with a longitudinal recess 146. The link 122a is similarly interconnected to an upwardly disposed bellcrank 145a and similar elements have been designated by like reference numerals plus the suffix "a" thereto. Bell-cranks 145, 145a are pivotally mounted on a shaft 147 which, in turn, is journally mounted at opposite ends thereof by bearing brackets 148, 148 which are carried by the frame 15. Also mounted on shaft 147 is a rocking head member 149 that may be constrained for rotation with said shaft, and a gear shift control hand lever 150 is pivotally connected at 151 to said head, while a knob-like handle 152 on the end of said lever facilitates actuation thereof by an operator. Gear shift hand lever 150 as disposed may be rotated with shaft 147 and may be pivoted about pivot 151 in a form of universal movement to selectively engage the oppositely facing recesses 146, 146a in the respective bell-cranks 145, 145a.

When it is desired to operate the vehicle in the first gear speed range the universally mounted operators gear shift control handle 150 is shifted to the position indicated 1 in the slotted gear shift pattern (FIGURE 9) which thereupon lifts or raises link 143a and thus pivots lower bell-crank 140a, counterclockwise as viewed in FIGURE 1, about its support pivot 141 thus causing the link 122a to move axially to the right, as seen in FIGURE 1, carrying with it pivotally connected lever 127a thus causing shafts 106, 106 and attached shifter forks 64, 64 to be moved outwardly relative to the center of the vehicle as viewed herein. Such movement effects meshing engagement of gears 62a, 62a with the respective gears 67, 67 and thus conditions the transmissions for the first gear speed ratio or range therethrough. To operate in the second gear speed ratio or range the control handle 150 is shifted rearwardly to the position indicated 2 in the slotted gear shift pattern (FIGURE 9) whereupon link 143a is moved downwardly causing bellcrank 140a to pivot clockwise and thus move the link 122a axially to the left as viewed in FIGURE 1. This rod 122a carries with it the pivotally connected lever 127a and, in turn, causes shafts 106, 106 and attached shifter forks 64, 64 to be moved inwardly relative to the central longitudinal axis of the vehicle as viewed herein. This latter movement effects a meshing engagement of gears 62b, 62b with the respective ring gears 65a, 65a and thereby conditions both transmissions for the second gear speed ratio or range therethrough. For the third gear speed ratio or range the gear shift control handle 150 is shifted to the position indicated 3 in the slotted-gear shift pattern (FIGURE 9) whereupon link 143 is moved downwardly causing lower bell-crank 140 to pivot clockwise and thus move the link 122 axially to the left as viewed in FIGURE 1. This rod 122 carries with it the pivotally connected lever 127 and, in turn, causes shafts 93, 93 and attached shifter forks 55, 55 to be moved inwardly toward the center of the vehicle as viewed herein. This latter movement effects a meshing engagement of gears 53, 53 with the respective gears 65b, 65b and thereby conditions the transmissions for the third gear speed ratio or range therethrough.

Since the hydraulic motors may be individually controlled by operation of direction control valve 27, it will be appreciated that a form of independent operation of the individual traction wheels is attained, even though the speed-gear-change transmissions thereof are coupled for simultaneous operation, thereby permitting turning or steering of the associated vehicle.

A braking device indicated in its entirety at 153 is secured to housing 40 by suitable mounting means such as the bolts or cap screws 154. Said braking device may be any conventional device which is adapted to apply braking action to the shaft 75 and brake the vehicle thus providing a braking feature supplemental to that inherent in the hydraulic propulsion motors. One such device found to be suitable for the purpose is the twin disc commercial product of Auto Specialties Company of St. Joseph, Michigan. It is understood, of course, suitable actuating mechanism will be provided according to the brake device selected for the purpose.

In the preferred embodiment illustrated herein it will be noted detachable covering devices have been provided for the ends of some of the shafts and since these covers in some instances provide additional functions further explanation may be in order. For instance, one end of shaft 75 is covered by a cover plate 155 which additionally functions as a bearing retainer for the anti-friction bearing means 76. Suitable fastening bolts 156 detachably affix said cover plate to housing 40. A cover plate 157 which is affixed by fastening bolts 158 to housing 40 covers one end of shaft 50 and also extends over one end of shaft 61 and provides supports 159, 159 for anti-friction bearing 60 journalling said latter shaft. Cover plate 157 has an end edge portion 160 that projects into a slotted recess 161 in shaft 69 and thus functions to retain the latter shaft in position against axial displacement. Resilient cover clip 162 covers an opposite end of shaft 61 while a similar cover clip 163 covers one end of shaft 81.

It should now be apparent that a novel change-speed gear-type power drive transmission adapted for employment in the limited space in the immediate vicinity of a vehicle traction wheel has been shown and described, and it is to be understood that changes may be made in the construction without departing from the spirit of the invention or the scope thereof as defined in the appended claims:

What is claimed is:
1. In a vehicle having a generally longitudinal support frame structure and a transversely extending wheel axle assembly fixedly mounted on said frame structure, the combination, comprising: a plurality of change-speed transmissions including a housing for each thereof: means detachably and non-rotatably mounting said transmission housings one each on an opposite end of said axle assembly; each of said transmissions including an input shaft, gearing mechanism operable for providing a plurality of selectable gear speed ratio drives therethrough, and an output shaft, and having said latter shaft extending therefrom on the side of the respective housing opposite that to which the proximate end of said axle assembly is mounted; a plurality of traction wheels detachably mounted one each on a respective one of said output shafts and constrained for rotation therewith; a plurality of hydraulic motors mounted one each on a respective one of said housings and being operatively connected to a respective one of said input shafts and operative for driving said transmissions; a source of fluid pressure connected for operation of said hydraulic motors; control linkage means interconnecting said change-speed transmissions and having said linkage operative for selecting simultaneously for each of said transmissions each of the gear speed ratio drives available through each of said change-speed transmissions; and control valve means interconnected between said source of fluid pressure and said hydraulic motors and operative for individually controlling the speed and direction of drive of each traction wheel irrespective of the gear speed ratio selected by said control linkage means for the transmission connected to a respective traction wheel thereby to effect steering of the vehicle.

2. The structure described in claim 1 and further characterized in that said input shaft is available for connection to the respective hydraulic motor on the same side of the transmission housing as that to which the wheel axle assembly is mounted.

3. In a vericle having a generally longitudinal support frame structure and a transversely extending wheel axle assembly fixedly mounted on said frame structure, the combination, comprising: a pair of change-speed power drive transmissions including housing enclosing each thereof; means detachably and non-rotatably mounting said transmission housings one each on opposite ends of said axle assembly; each of said transmissions including an input shaft, change-speed gearing mechanism operable for providing a plurality of selectable gear speed ratio drives therethrough, and an output shaft, and having said latter shaft extending through one side of a respective housing on the side thereof opposite that to which the proxmate end of said axle assembly is mounted; a pair of traction wheels; each said wheel being fashioned to include a central flange member dished with the convex portion thereof facing outwardly away from a proximate end of said axle assembly; said traction wheels being detachably mounted one each on a respective output shaft and constrained for rotation therewith, and having a substantial portion of a respective transmission housing disposed within the proximate traction wheel; a pair of fluid pressure motors mounted one each on a respective one of said housings and being operatively connected to the respective input shafts and operative for driving said transmissions; a source of fluid pressure connected for operation of said fluid pressure motors; control valve means interconnected between said source of fluid pressure and said fluid pressure motors for individually controlling said motors thereby to accomplish steering of the vehicle; and control linkage means interconnecting said change-speed transmissions and having said linkage operative for selecting simultaneously for each of said transmissions each of the gear speed ratio drives available through each of said change-speed transmissions, regardless of a variation in speeds of said fluid pressure motors relative to one another.

4. In an agricultural vehicle having a frame, an axle assembly mounted on the frame, a change-speed transmission mounted one at each end of the axle assembly and traction wheels mounted one on each transmission, the combination comprising, a control linkage interconnecting said transmissions including a pair of transversely extending links connected at one end into one of said transmissions, a pair of reversing levers pivotally mounted on the axle assembly and pivotally connected at one end thereof one each to said links, and a pair of cranks pivotally connected at one end thereof one each to another end of said reversing levers and at the other end thereof said cranks being connected into another one of said transmissions; control handle operating means mounted on the vehicle frame and disposed for actuation by a vehicle operator; motion-transmitting means interconnecting said handle and said pair of transversely extending links including means for translating movements of said control handle into a selective movement of one of said pair of links whereby a predetermined gear speed ratio is simultaneously selected for each of said transmissions.

5. In an agricultural vehicle having a frame, an axle assembly mounted on the frame, a change-speed transmission mounted one at each end of the axle assembly and traction wheels mounted one on each transmission, the combination comprising, a control linkage interconnecting said transmissions including a pair of transversely extending rigid links connected at one end into one of said transmissions, a pair of reversing levers pivotally mounted on the axle assembly and pivotally connected at one end thereof one each to said links, and a pair of cranks pivotally connected at one end thereof one each to another end of said reversing levers and at the other end thereof said cranks being connected into another one of said transmissions, control handle operating means mounted on the vehicle frame and disposed for actuation by a vehicle operation, a pair of bellcranks pivotally mounted on the vehicle frame and having one end of one arm of each pivotally connected by a lost-motion connection with a respective one of said transversely extending links, a pair of vertically extending links having one end of each pivotally connected to another arm of a respective one of said bellcranks, operating means carried by the vehicle and including a control handle disposed for actuation by a vehicle operator, means interconnecting said handle with said latter links including means for translating movements of the handle into movement of a selective one of said vertically extending pair of links whereby a predetermined gear speed ratio is simultaneously selected in each of said change-speed transmissions.

6. In an agricultural vehicle having a frame, an axle assembly mounted on the frame, a pair of change-speed transmissions including gearing therein operable to selectively provide any one of a plurality of speed ratio drives therethrough and mounted one on each end of the axle assembly and traction wheels mounted one each on an output shaft of a respective one of said transmissions, the combination, comprising, a plurality of motion-transmitting control linkages interconnecting said transmissions, and including a plurality of direction reversing means whereby opposite ends of said control linkages move in opposite directions upon movement of a respective one of said linkages operating means carried by the vehicle and including a control handle disposed for actuation by a vehicle operator, motion-transmitting means interconnecting said handle operating means with said motion-transmitting control linkages including means for translating movements of the handle into selective movement of said control linkages whereby a predetermined gear speed ratio is selected simultaneously in each of said change-speed transmissions.

7. In a vehicle having a generally longitudinal support frame structure and a transversely extending wheel axle assembly fixedly mounted on said frame structure, the combination, comprising: a pair of change-speed transmissions including a housing for each thereof; means mounting said transmission housings one each on an opposite end of said axle assemble; each of said transmissions including an input shaft, gearing mechanism positionably arrangeable to provide a plurality of gear speed ratio drives through the tranmission, a pair of shifter fork mechanisms having a portion on each thereof extending through said housing and operable to selectively provide any one of the plurality of gear speed ratio drives available through the transmission, an output shaft, and having said output shaft extending therefrom on the side of the respective housing opposite that to which the proximate end of said axle assembly is mounted; a pair of traction wheels mounted one each on a respective one of said output shafts rotation therewith; a pair of fluid pressure motors mounted one each on a respective one of said housings and being operatively connected to the respective input shafts and operative for driving said transmissions; a source of fluid pressure connected for operation of said fluid pressure motors; control valve means interconnected between said source of fluid pressure and said fluid pressure motors and operative for individually controlling said motors thereby to effect a steering of the vehicle; motion-transmitting control linkage interconnecting said transmissions including a pair of transversely extending links each of which is connected at one end to a respective one of said outwardly extending shifter fork mechanisms of one of said transmissions, a pair of reversing levers pivotally mounted on the axle assembly and pivotally connected at one end thereof one each to said links, and a pair of cranks pivotally connected at one end thereof one each to another end of said reversing levers and at another end thereof said cranks being connected one each to a respective one of said outwardly extending shifter fork mechanisms of another one of said transmissions; control handle operating means mounted on the vehicle frame structure and including motion-transmitting means interconnecting said handle selectively with said pair of transversely extending links whereby movements of said handle are translated into selective movements of one of said pair of links so as to simultaneously condition said transmissions for a predetermined one of the plurality of available gear speed ratio drives through said transmissions.

8. In a vehicle having a generally longitudinal support frame structure and a transversely extending wheel axle assembly fixedly mounted on said frame structure, the combination, comprising: a pair of change-speed transmissions including a housing for each thereof; means mounting said transmission housings one each on an opposite end of said axle assembly; each of said transmissions including an input shaft, gearing mechanism positionably arrangeable to provide a plurality of gear speed ratio drives through the transmission, a pair of shifter fork mechanisms having a portion on each thereof extending through said housing and operable to selectively provide any one of the plurality of gear speed ratio drives available through the transmission, an output shaft, and having said output shaft extending therefrom on the side of the respective housing opposite that to which the proximate end of said axle assembly is mounted; a pair of traction wheels mounted one each on a respective one of said output shafts for rotation therewith; a pair of fluid pressure motors mounted one each on a respective one of said housings and being operatively connected to the respective input shafts and operative for driving said transmissions; a source of fluid pressure connected for operation of said fluid pressure motors; control valve means interconnected between said source of fluid pressure and said fluid pressure motors and operative for individually controlling said motors thereby to accomplish a steering of the vehicle; interlocking detent means cooperative between each of said pair of shifter fork mechanism whereby one of said fork mechanisms must be in a neutral position before the other said fork mechanism of said pair may be shifted to select a predetermined one of said gear speed ratios in the respective transmission; a pair of motion-transmitting control linkage mechanisms interconnecting the respective shifter fork mechanisms of said transmissions and operable to provide simultaneous movement to the respective interconnected shifter fork mechanisms; control handle operating means mounted on the vehicle frame structure and including motion-transmitting means interconnecting said handle selectively with said pair of control linkage mechanisms whereby movements of said handle are translated into selective movements of one of said pair of control linkage mechanisms so as to simultaneously condition said transmissions for a predetermined one of the plurality of available gear speed ratio drives through said transmissions.

9. The structure described in claim 8 and further characterized in that said interlocking detent means includes a recess fashioned in each of said shifter fork mechanisms with said recesses facing one another and having a passage extending therebetween, said passage having a pair of ball members freely positioned therein and having said balls and recesses dimensioned so that when one of said balls engages one of said recesses the other ball is disengaged from the other of said recesses whereby the respective shifter fork mechanism is free to be actuated.

References Cited by the Examiner
UNITED STATES PATENTS

| | | | |
|---|---|---|---|
| 2,258,328 | 10/1941 | Lee | 180—48 X |
| 2,384,447 | 9/1945 | Baldwin | 180—66 |
| 2,421,013 | 5/1947 | Cornwell | 180—66 X |
| 2,833,362 | 5/1958 | Martin | 180—66 |
| 3,154,164 | 10/1964 | Shaw | 180—44 |

BENJAMIN HERSH, *Primary Examiner.*

W. A. MARCONTELL, J. A. PEKAR,
*Assistant Examiners.*